United States Patent
Li et al.

(10) Patent No.: US 12,490,682 B1
(45) Date of Patent: Dec. 9, 2025

(54) **METHOD FOR RAPIDLY RESTORING *PHRAGMITES AUSTRALIS* POPULATION IN DEGRADED LAND THROUGH STOLON DOMESTICATION**

(71) Applicant: Northeast Institute of Geography and Agroecology, Chinese Academy of Sciences, Changchun (CN)

(72) Inventors: Xiaoyu Li, Changchun (CN); Bolong Wen, Changchun (CN); Miao Wang, Changchun (CN); Rumeng Duan, Changchun (CN); Tiantian Gan, Changchun (CN); Rongfang Du, Changchun (CN)

(73) Assignee: Northeast Institute of Geography and Agroecology, Chinese Academy of Sciences, Changchun (CN)

( * ) Notice: Subject to any disclaimer, the term of this patent is extended or adjusted under 35 U.S.C. 154(b) by 0 days.

(21) Appl. No.: 19/030,936

(22) Filed: Jan. 17, 2025

(30) Foreign Application Priority Data

Oct. 31, 2024 (CN) .......................... 202411535695.3

(51) Int. Cl.
*A01G 2/00* (2018.01)
*A01G 22/00* (2018.01)

(52) U.S. Cl.
CPC ............... *A01G 2/00* (2018.02); *A01G 22/00* (2018.02)

(58) Field of Classification Search
CPC ............. A01G 2/00; A01G 2/10; A01G 22/00
See application file for complete search history.

(56) References Cited

FOREIGN PATENT DOCUMENTS

| CN | 102017856 | A |   | 4/2011 |          |
|----|-----------|---|---|--------|----------|
| CN | 107046843 | A |   | 8/2017 |          |
| CN | 109042125 | A | * | 12/2018 | ............. A01B 79/00 |
| CN | 113229068 | A |   | 8/2021 |          |

OTHER PUBLICATIONS

Notice of first Office action dated Apr. 3, 2025 in SIPO application No. 202411535695.3.
Retrieval report-First search dated Mar. 31, 2025 in SIPO application No. 202411535695.3.
Notice of Ssecond Office action dated May 9, 2025 in SIPO application No. 202411535695.3.
Notification to Grant Patent Right for Invention dated Jul. 14, 2025 in SIPO application No. 202411535695.3.
Hu Jiaqi, "Reed," Today Science & Technology, Dec. 31, 1982, p. 32, Issue 03, Claims involved: 1-8.
Jiang Shude, "Reed second forest," Life World, Oct. 15, 1978, pp. 33-34, Issue 05, Claims involved: 1-8.
Wen Bin, "Phoenix reed," Hydro Science and Cold Zone Engineering, May 31, 1986, p. 7, Issue 02, Claims involved: 1-8.
Xu Guizhen et al., "Breeding technology of aquatic plants," Jul. 31, 1995, p. 95, Edition 1, Anhui science and technology publishing house, Claims involved: 1-8.
Supplementary retrieval—Second search dated Jul. 9, 2025 in SIPO application No. 202411535695.3.

* cited by examiner

*Primary Examiner* — Magdalena Topolski
*Assistant Examiner* — Spencer T Callaway
(74) *Attorney, Agent, or Firm* — Pilloff Passino & Cosenza LLP; Rachel Pilloff; Sean Passino

(57) ABSTRACT

A method for rapidly restoring *Phragmites australis* population in degraded land through stolon domestication is provided, including the following steps: at the beginning of the *Phragmites australis* growing season from May to June every year, the *Phragmites australis* is made to crawl by draining water and artificially crushing the aboveground stems, and then the sprouting of stolon internode buds or root buds is promoted by continuously controlling water; in mid-July, suitable stolons containing internode buds or root buds are selected, and the root segments are dug from the base, and the stolons are wound in a circle in the extension direction and fixed, and sprayed with water to keep moisture; the fixed stolons are unfolded and transplanted into degraded land for daily water and fertilizer management.

1 Claim, No Drawings

METHOD FOR RAPIDLY RESTORING *PHRAGMITES AUSTRALIS* POPULATION IN DEGRADED LAND THROUGH STOLON DOMESTICATION

CROSS-REFERENCE TO RELATED APPLICATIONS

This application claims priority to Chinese Patent Application No. 202411535695.3, filed on Oct. 31, 2024, the contents of which are hereby incorporated by reference.

TECHNICAL FIELD

The disclosure belongs to the technical field of vegetation restoration, and in particular to a method for rapidly restoring *Phragmites australis* population in degraded land through stolon domestication.

BACKGROUND

Desertification and salinization are serious ecological problems in land degradation. For example, in the past 50 years, the area of saline-alkali land in the west of Songnen Plain has increased by 1.73 times, and grassland, wetland and farmland degradation are one of the sources of saline-alkali land. Desertification and salinization cause drought and saline-alkali stress to vegetation, which makes it difficult for plants to establish and grow. How to manage degraded land efficiently is an important problem to be solved urgently at present.

*Phragmites australis* is a perennial rhizomatous gramineous plant with wide ecological amplitude, strong reproductive capacity and high yield, and has strong habitat adaptability. It is distributed in marshes, hills, tidal flats, freshwater lakesides, clayey land, sandy land, saline-alkali land and valleys, and may adapt to the water level of −1 m to 1 m and the salinity of 0-20%. It is the dominant species of floodplain, estuary and coastal area. *Phragmites australis* has many remarkable economic and ecological values, which may be used not only as raw materials for paper making, mat making and building, but also as ecological functions of providing bird habitats and purifying water quality. *Phragmites australis* rhizomes may also be used as Chinese herbal medicines. Therefore, *Phragmites australis* is one of the high-frequency selection species for many degraded soils and reconstruction.

The establishment and propagation of *Phragmites australis* population in natural habitat mainly depends on asexual reproduction of rhizomes, and occasionally, when the environment changes, *Phragmites australis* depends on stolons aboveground for population reproduction, and the sexual reproduction ability is relatively weak. The common methods of *Phragmites australis* population restoration are tapping *Phragmites australis* flowers, transplanting rhizomes, transplanting *Phragmites australis* piers and pressing green *Phragmites australis* stem, which may be summarized into three methods: using seeds, rhizomes and stems. Among them, the relative survival rate of rhizome propagation is high, but both the method of burying rhizome and *Phragmites australis* pier need to destroy the original *Phragmites australis* population structure, and the collection intensity is high, resulting in ecological damage; seed propagation, *Phragmites australis* seeds are very small, low inclusion leads to low germination rate, weak seedlings, poor environmental tolerance and low survival rate; the method of cutting *Phragmites australis* twigs or pressing green *Phragmites australis* stem is easier to collect and sow than rhizomes and seeds, but it has low survival rate and slow establishment. The three breeding methods also have strict requirements for water and salinity in the environment.

SUMMARY

In order to promote the greening of degraded land, and solve the problems of high cost of rhizomes transplantation, great ecological destruction, low survival rate of seeds and aboveground green *Phragmites australis* and slow planting in traditional *Phragmites australis* restoration methods, the disclosure provides a method for rapidly restoring *Phragmites australis* population in degraded land through stolon domestication, which has the advantages of high speed, high survival rate and low cost, and provides a basis for desertification and salinization land control and marshes restoration.

In order to achieve the above objective, the present disclosure provides the following technical scheme.

A method for rapidly restoring *Phragmites australis* population in degraded land through stolon domestication is provided, including the following steps:
  at the beginning of *Phragmites australis* growing season from May to June every year, making the *Phragmites australis* crawl by a method of draining water and artificially overwhelming aboveground stems, and then promoting the sprouting of internode buds or root buds of stolons by continuously controlling water;
  in mid-July, selecting suitable stolons including the internode buds or the root buds, and digging the root segments from a base, and winding the stolons into rings in an extension direction and fixing; and
  transplanting fixed stolons into the degraded land, and performing daily water and fertilizer management.

Further, the selected stolons meet following conditions: a stolon length exceeds 4 m, a germination rate of the internode buds exceeds 70%, and a root system does not extend into soil.

Further, when winding the stolons into the rings in the extension direction and fixing, ensuring that the internode buds or the root buds are not broken.

Further, the specific steps of stolon transplantation are: soil preparation, ditching, spreading the fixed stolons, vertically inserting one end of a rhizome into soil in a ditch, then spreading the stolons horizontally and laying the stolons in a prepared ditch, and covering the soil.

Further, conditions of the ditching are: a ditching depth is 5-10 cm, and a ditching spacing is 0.5-1 m.

Further, a stolon spacing in each ditch is 0.5-1 m.

Further, specific operations of the daily water and fertilizer management are as follows: paving the stolons, covering the soil and watering, a watering amount is subject to water in the soil being saturated within 1-2 weeks, and then replenishing water once every 1 week until the water in the soil is saturated; one month after transplanting, potassium nitrate is selectively supplemented according to establishment conditions of the stolons to promote growth of the stolons.

Further, the degraded land refers to salinized land, desertified land, degraded marsh, degraded grassland or abandoned farmland.

Compared with the prior art, the disclosure has the following advantages and technical effects.

According to the disclosure, stolons are domesticated through a specific domestication mode, buds and fibrous roots are rapidly generated on the nodes of the stolons, and then the stolons are domesticated to establish and restore the *Phragmites australis* population, and the restoration of the *Phragmites australis* population may be accelerated in cooperation with water and fertilizer management. This method has the advantages of high speed, low cost and high survival rate.

According to the disclosure, stolons are used to replace the propagation and planting modes of *Phragmites australis* seeds, rhizomes and overground vertical stems, the method is simple and easy to implement, and the planting rate of *Phragmites australis* is higher than that of the traditional mode, which may greatly promote the ecological management of degraded land and the recovery of *Phragmites australis* population.

The method for rapidly restoring *Phragmites australis* population by creeping *Phragmites australis* may be used in various soil conditions.

DETAILED DESCRIPTION OF THE EMBODIMENTS

A number of exemplary embodiments of the present disclosure will now be described in detail, and this detailed description should not be considered as a limitation of the present disclosure, but should be understood as a more detailed description of certain aspects, characteristics and embodiments of the present disclosure.

It should be understood that the terminology described in the present disclosure is only for describing specific embodiments and is not used to limit the present disclosure. In addition, for the numerical range in the present disclosure, it should be understood that each intermediate value between the upper limit and the lower limit of the range is also specifically disclosed. The intermediate value within any stated value or stated range and every smaller range between any other stated value or intermediate value within the stated range are also included in the present disclosure. The upper and lower limits of these smaller ranges may be independently included or excluded from the range.

Unless otherwise specified, all technical and scientific terms used herein have the same meaning as commonly understood by one of ordinary skill in the art to which this disclosure relates. Although the present disclosure only describes the preferred methods and materials, any methods and materials similar or equivalent to those described herein may also be used in the practice or testing of the present disclosure. All documents mentioned in this specification are incorporated by reference to disclose and describe methods and/or materials related to the documents. In case of conflict with any incorporated document, the contents of this specification shall prevail.

It is obvious to those skilled in the art that many improvements and changes may be made to the specific embodiments of the present disclosure without departing from the scope or spirit of the present disclosure. Other embodiments will be apparent to the skilled person from the description of the disclosure. The description and example of that present disclosure are exemplary only.

The terms "comprising", "including", "having" and "containing" used in this disclosure are all open terms, which means including but not limited to.

The disclosure aims to solve the technical problems that the utilization rate of degraded land is low, plants are difficult to grow, and the traditional method of *Phragmites australis* population restoration has high cost of rhizome transplanting and great ecological damage, low survival rate of direct seeding of seeds, slow transplanting and planting, low survival rate of aboveground stem cutting and slow planting. The technical scheme includes the following steps. 1. Domesticating stolons to produce internode buds or root buds; 2. cutting off and preserving stolons; 3. performing transplanting and water and fertilizer management for the stolons. In the disclosure, the *Phragmites australis* stolon may be used in various soil conditions to quickly restore the *Phragmites australis* population. The disclosure is applied to the restoration method of *Phragmites australis* population on degraded land.

Stolon is a kind of abnormal stem of reed, which has the same lateral growth function as rhizomes. The difference is that they grow on the surface and underground respectively, belonging to a morphological structure of *Phragmites australis* adapted to the environment, and the crawling speed is very fast, with an average of 8 cm per day and a total length of 10 m in the growing season. However, there are not many stolons growing in normal environment, and only when water and salt are abnormal will erect stolons grow from the ground up. Therefore, the disclosure domesticates stolons through a specific domestication mode, and then uses stolon domestication to establish and restore *Phragmites australis* populations, which has the advantages of high speed, low cost and high survival rate.

Reed stolons usually occur in flooded dry areas or arid areas. When there are suitable hydrological conditions near the stolons, the disclosure quickly produces buds and fibrous roots on the nodes of the stolons through induction. In the disclosure, stolons are used to replace the propagation and planting modes of *Phragmites australis* seeds, rhizomes and aboveground erect stems, and the method is simple and easy to implement, and the planting rate of *Phragmites australis* is higher than the traditional mode.

The specific technical scheme is as follows:

1) domesticating stolons to produce internode buds or root buds: *Phragmites australis* stolons are often flooded and then drained in areas with a certain slope or in salinized meadows. In the former, the longest stolon length of *Phragmites communis* may exceed 10 m, and the average node length is 18.3 cm, and the ratio of internode bud production accounts for more than 70% of the total nodes. In the latter, the stolon of *Phragmites australis* is generally less than 2 m, with an average node length of 8.3 cm, and the proportion of internode buds is about 40% of the total nodes. The stolon of *Phragmites australis* mainly occurs in early June, and the creeping growth rate of *Phragmites australis* reaches the highest in mid-July. In mid-July, *Phragmites australis* stolons are selected in lakeside or river bank drainage area. At this time, the number of internode buds reached the maximum, and the root system of internode just begin to germinate, and a small amount extended into the soil. Locking the material area needed for transplanting *Phragmites australis*, at the beginning of the *Phragmites australis* growing season from May to June, creeping the *Phragmites australis* by draining water and artificially crushing the aboveground stems, and then promoting the germination of stolon internode buds or root buds by supplementing water.

2) Cutting off and preserving stolons: at the beginning of July, selecting stolons with the sprouting rate of internode buds or root buds exceeding 70%, the length exceeding 4 m and the root system not extending into the soil, digging the root section from the base, wrapping the stolon in the extension direction into a circle, tying with a small rope, spraying some water and putting in a bag for later use, and be careful to ensuring that the internode buds are not broken in this process.

3) Performing transplanting and water and fertilizer management for the stolons: selecting plots of degraded land, and using agricultural machinery to open ditches with a depth of 5-10 cm and a spacing of 0.5-1 m; spreading the stolon, and after one end of the rhizome is vertically inserted into the soil, spreading the stolon flat and spreading stolon into the prepared ditching, and then covering the soil. The stolon spacing in each ditch is 0.5-1 m. Watering after successful transplanting, the amount of watering is subject to the water in the soil being saturated for about one week, and then replenishing water once every week until the water in the soil is saturated; one month after transplanting, potassium nitrate is selectively supplemented according to the establishment of stolons to promote the growth of stolons.

The degraded land refers to saline-alkali land, sandy land, degraded marsh, degraded grassland or abandoned farmland.

The raw materials used in the disclosure are all purchased in the market.

The technical scheme of the present disclosure will be further explained by examples.

Embodiment 1

A method for rapidly restoring *Phragmites australis* population in degraded land through stolon domestication includes the following specific steps.

1) Domesticating stolons to produce internode buds or root buds: taking the seriously degraded marsh area of Niuxintaobao wetland *Phragmites australis* field as the experimental base, at the beginning of *Phragmites australis* growing season in May-June 2020, *Phragmites australis* were crawled by draining water and artificially overwhelming aboveground stems, and then the sprouting of stolons' internode buds or root buds was promoted by continuously controlling water;

2) Cutting off and preserving stolons: in mid-July, selecting stolons with the sprouting rate of internode buds or root buds exceeding 70% and the length exceeding 4 m, with the root system not extending into the soil, digging the root section from the base, wrapping the stolons in the extension direction into a circle and tying with a small rope, spraying some water and putting the stolons in a bag for later use, and carefully ensuring that the internode buds are not broken in this process;

3) Performing transplanting and water and fertilizer management for the stolons: selecting suitable plots (pH is about 9.6) in severely degraded marsh areas, and using agricultural machinery to open ditches with a depth of 5 cm and a ditch spacing of 0.5 m; spreading the collected stolons, vertically inserting the rhizomes at one end into the soil, spreading the stolons horizontally into a prepared trench, and covering the trench with soil, where the stolons in each trench were 1 m apart; watering after successful transplanting, the amount of watering was subject to the water in the soil being saturated for about one week, and then replenishing water once every week until the water in the soil was saturated; one month after transplanting, potassium nitrate was selectively supplemented according to the establishment of stolons to promote the growth of stolons.

In this embodiment, three stolons were transplanted, and the specifications of the transplanted *Phragmites australis* stolons are shown in Table 1. The monitoring results of the survival rate of stolons one month after transplantation are shown in Table 2.

TABLE 1

Specifications of transplanted *Phragmites australis* stolons

| NO. | Total length of stolon (cm) | Number of nodes | Internode length (cm) | Number of buds (seedlings) | Number of nodes of fibrous roots | Proportion of nodes of growing buds or roots to total nodes (%) |
| --- | --- | --- | --- | --- | --- | --- |
| 1 | 973 | 49 | 19.86 | 45 | 49 | 100 |
| 2 | 483 | 34 | 14.2 | 25 | 21 | 73.53 |
| 3 | 776 | 37 | 20.97 | 20 | 27 | 72.97 |

TABLE 2

Monitoring of survival rate of stolons after transplantation

| NO. | Number of transplanted buds | Survival number | Survival rate (%) |
| --- | --- | --- | --- |
| 1 | 45 | 40 | 88.89% |
| 2 | 25 | 22 | 88% |
| 3 | 20 | 20 | 100% |

As can be seen from Table 1 and Table 2, after transplanting stolons to seriously degraded *Phragmites australis* marshland in mid-July, the survival rate exceeded 90% after one month of water and fertilizer management. After the *Phragmites australis* growing season ended in October, the tillers of transplanted seedlings increased by more than one time, and new rhizomes were formed.

This method effectively helped to restore the *Phragmites australis* population in the severely degraded area of 50 mu (1 mu=666.67 $m^2$) (pH>9) in the experimental area. In mid-July 2020, it was transplanted, and each square meter was equivalent to two stolon seedlings, with about 10-15 plants. By October, few new tillers were formed, and most of them germinated into underground rhizomes, so the population coverage was almost the coverage of transplanting, less than 20%. In October 2021, the coverage of the population reached about 50%.

The above is only the preferred embodiment of this application, but the protection scope of this application is not limited to this. Any change or replacement that may be easily thought of by a person familiar with this technical field within the technical scope disclosed in this application should be included in the protection scope of this application. Therefore, the protection scope of this application should be based on the protection scope of the claims.

What is claimed is:

1. A method for rapidly restoring *Phragmites australis* population in degraded land through stolon domestication, comprising following steps:
- at a beginning of *Phragmites australis* growing season from May to June every year, making the *Phragmites australis* crawl by a method of draining water and artificially overwhelming aboveground stems, and then promoting sprouting of internode buds or root buds of stolons by continuously controlling water;
- in mid-July, selecting suitable stolons comprising the internode buds or the root buds, and digging root segments from a base, and winding the stolons into rings in an extension direction and fixing;
- transplanting fixed stolons into the degraded land, and performing daily water and fertilizer management;
- wherein, the selected stolons meet following conditions: a stolon length in an excess of 4 m, a germination rate of the internode buds in an excess of 70%, and a root system not extending into soil;
- wherein, when winding the stolons into the rings in the extension direction and fixing, the internode buds or the root buds are not broken;
- wherein, specific steps of stolon transplantation are: preparing soil, ditching, spreading the fixed stolons, vertically inserting one end of a rhizome into soil in a ditch, then spreading the stolons horizontally and laying the stolons in a prepared ditch, and covering the soil;
- wherein, conditions of the ditching are: a ditching depth as 5-10 cm, a ditching spacing as 0.5-1 m; and a stolon spacing in each ditch is 0.5-1 m;
- wherein, specific operations of the daily water and fertilizer management are: paving the stolons, covering the soil and watering, watering with a watering amount subject to water in the soil being saturated within 1-2 weeks, and then replenishing water once every 1 week until the water in the soil is saturated; selectively supplementing potassium nitrate one month after transplanting, according to establishment conditions of the stolons to promote growth of the stolons;
- wherein, hydrogen ion concentration (pH) of the degraded land is 9.6; and
- wherein, the degraded land refers to salinized land, desertified land, degraded marsh, degraded grassland or abandoned farmland.

* * * * *